United States Patent [19]

Finkelstein et al.

[11] 4,373,176

[45] Feb. 8, 1983

[54] ELECTROLYTIC CAPACITOR FOR AT LEAST 200 V SERVICE

[75] Inventors: Manuel Finkelstein, North Adams; Sidney D. Ross; Franz S. Dunkl, both of Williamstown, all of Mass.

[73] Assignee: Sprague Electric Company, North Adams, Mass.

[21] Appl. No.: 306,992

[22] Filed: Sep. 30, 1981

[51] Int. Cl.$^3$ ............................................. H01G 9/02
[52] U.S. Cl. .................................... 361/433; 252/62.2
[58] Field of Search ......................... 252/62.2; 361/433

[56] References Cited

U.S. PATENT DOCUMENTS

| | | | |
|---|---|---|---|
| 3,293,506 | 12/1966 | Chesnot | 252/62.2 X |
| 3,351,823 | 11/1967 | Jenny | 252/62.2 X |
| 3,547,423 | 12/1970 | Jenny et al. | 317/320 |
| 3,588,625 | 6/1971 | Kihara et al. | 252/62.2 X |
| 3,609,468 | 9/1971 | Kihara et al. | 252/62.2 X |
| 3,812,039 | 5/1974 | Niwa | 252/62.2 |

FOREIGN PATENT DOCUMENTS 52-85356  7/1977  Japan .

*Primary Examiner*—Jack Cooper

[57] ABSTRACT

An aluminum electrolytic capacitor capable of operation at 200 VDC or higher and 130° C. contains as its electrolyte a tertiary amine or a dipropylamine mono salt of dodecanedioic acid dissolved in a solvent mixture of ethylene glycol and N-methyl-2-pyrrolidinone and water.

8 Claims, 3 Drawing Figures

ELECTROLYTIC CAPACITOR FOR AT LEAST 200 V SERVICE

BACKGROUND OF THE INVENTION

This invention relates to an aluminum electrolytic capacitor containing an electrolyte of a mono salt of dodecanedioic acid and a tertiary amine or a diproylamine as solute, water, and a mixture of ethylene glycol and N-methyl-2-pyrrolidinone as solvent, the electrolyte permitting capacitor operation at 130° C. and 200 VDC or above.

Electrolytes for aluminum electrolytic capacitors operating at voltages of 200 V or higher most commonly contain salts of boric acid or boric acid derivatives in ethylene glycol. The maximum operating temperature for such an electrolyte system is less than 100° C. and normally 65°-85° C. The temperature limitation is due to the rapid reaction of glycol with boric acid and other borate species to form polymeric glycol-borates and water at about 100° C. The minimum operating temperature in such a system is above −20° C., since glycol freezes at −17.4° C.

The effective operating range can be expanded in both directions by replacing the glycol solvent with N,N-dimethylformamide (hereinafter DMF) which has a boiling point of 153° C. and a freezing point of −61° C. However, DMF is a very aggressive solvent that attacks most materials of construction. While the most resistant material for sealing gaskets and O-rings is Butyl rubber, DMF will be transmitted through a Butyl rubber closure at a rate which increases with increasing temperature and which limits the life of the capacitor, since the capacitor will not function adequately when the electrolyte loses half its solvent. This continuous slow loss of DMF also introduces a new difficulty, particularly if the capacitor is operating in a confined space, as the flash point of DMF is 67° C.

In contrast glycol, which has a boiling point of 197.2° C. and a flash point of 116° C., is a much safer material, is much easier to contain, and its rates of transmission through both Butyl rubber and EPR rubber are almost negligible.

In current power supply applications, it is desirable to have an electrolytic capacitor operating at 200 VDC but capable of having superimposed on this DC voltage sufficient AC ripple voltage to raise the internal temperature to 120°-125° C. at an ambient temperature of 85° C. An electrolytic capacitor that could operate continuously at 200 VDC at an ambient temperature of 130° C. would meet the above high-temperature requirements.

The low-temperature requirements are much less stringent; it is likely that more than 90% would be met by a capacitor that retained 50% of its capacity at −40° C. and 70% of its capacity at −20° C. The requirements might, with some solutes, be met with an electrolyte in which glycol was the only solvent (other than water) and would certainly be met in an electrolyte in which glycol was mixed with an appropriate cosolvent. Such solvent systems are described by Ross and Finkelstein in copending application Ser. No. 22,554, filed Mar. 2, 1979.

Thus, it is desirable to develop an electrolytic capacitor capable of operating continuously at a voltage of 200 VDC or higher at an ambient temperature of 130° C. and providing modest low temperature properties. However, the solute cannot be a borate, since borates react with glycol. In fact, the solute must be one which does not react chemically with either glycol or any other cosolvent that is used.

In addition, the solute must have excellent stability at the operating temperature, 130° C., and good stability at somewhat higher temperatures. Thus, 150° C. was chosen for screening purposes, and resistivity increases must be less than 25% after 1000 hr at 150° C.

The major cause of resistivity increase, particularly where the solute is an ammonium or substituted ammonium salt of a monobasic or dibasic carboxylic acid is amide formation which converts conducting salt to a non-conducting amide. Generally, this reaction manifests itself through an increase in the resistivity of the electrolyte. Amide formation is easiest with ammonium salts, and the reaction occurs more readily with salts of primary amines than with salts of secondary amines. The reaction can even occur with salts of tertiary amines, although it is more difficult, since amide formation now requires cleavage of a carbon-nitrogen bond.

Another possible degradative reaction is ketone formation. This reaction is likely for the formation of $C_5$ to $C_7$ ketones, i.e. with salts of adipic, pimelic and suberic acids, but is of little consequence for the higher dibasic acids.

Electrolytes in which the solutes are amine salts of dodecanedioic acid meet the requirements given above. The diammonium salt of dodecanedioic acid has been disclosed in Japanese Showa 52-85356, and a solution of this salt in glycol-water is satisfactory in capacitors at 85° C. Dodecanedioic acid can form both mono- and di-salts with amines, but the monoamine salts are considered to be more suitable. The iso-electric point, i.e. the point of maximum chemical stability and minimum solubility for aluminum oxide is at pH 5.5. Therefore, a slightly acid solute (i.e. a mono salt) is less likely to attack the aluminum oxide dielectric than a slightly basic solute (i.e. a di-salt). This consideration is of dominent importance at temperatures as high as 150° C.

SUMMARY OF THE INVENTION

An aluminum electrolytic capacitor is provided that is capable of continuous operation at 130° C. and 200 VDC or above through the use of an electrolyte having a mono salt of dodecanedioic acid and a dipropylamine or tertiary amine as solute, water, and a mixture of ethylene glycol and N-methyl-2-pyrrolidinone as solvent. The preferred mono salts are di-n-propylammonium, diisopropylammonium, trimethylammonium, triethylammonium and N-ethyl-piperidinium.

Mono salts of dodecanedioic acid with primary amines were too unstable to be used at the temperatures required, as solutions of them rapidly increased in resistivity at above 100° C. Most of the amine salts were also sufficiently insoluble in glycol so that a cosolvent was required.

As noted above, mono salts of dodecanedioic acid and primary amines were unsatisfactory for the purposes of the present invention. Similarly, such salts with secondary amines, with the notable exceptions of the mono(di-n-propylammonium) salt and the mono(diisopropylammonium) salt, were either unsatisfactory or marginal with respect to stability or other electrolyte properties.

The choice of a cosolvent for glycol is critical. The solvent chosen must have a boiling point and flash point such that the flammability of the mixture will not be significantly increased and such that vapor transmission of the mixture through capacitor closures will not be significantly greater than that observed with glycol alone. Glycol is a protic solvent which can function as both a hydrogen donor and a hydrogen acceptor in hydrogen bonding, but its primary role in hydrogen bonding and in solvation and solubilization of a salt is in its capacity as a hydrogen donor in hydrogen bonding. To enhance the solubility of the salts and maximize the conductivity in the mixed solvent system, the cosolvent must be of a different type, i.e. an aprotic solvent which can function only as a hydrogen acceptor in hydrogen bonding and which is especially effective in solubilizing the cationic portion of the salt.

While DMF meets this latter requirement, it is not desirable for the reasons stated above. However, all of the requirements are met by adding N-methyl-2-pyrrolidinone (NMP) to glycol. This aprotic solvent has a boiling point of 202° C., a flash point of 95° C. and an autogenous ignition temperature of 346° C. As will be shown subsequently, this solvent augments the properties of glycol and results in greater salt solubilities and more highly conducting solutions.

DESCRIPTION OF THE PREFERRED EMBODIMENTS

Figure 1:
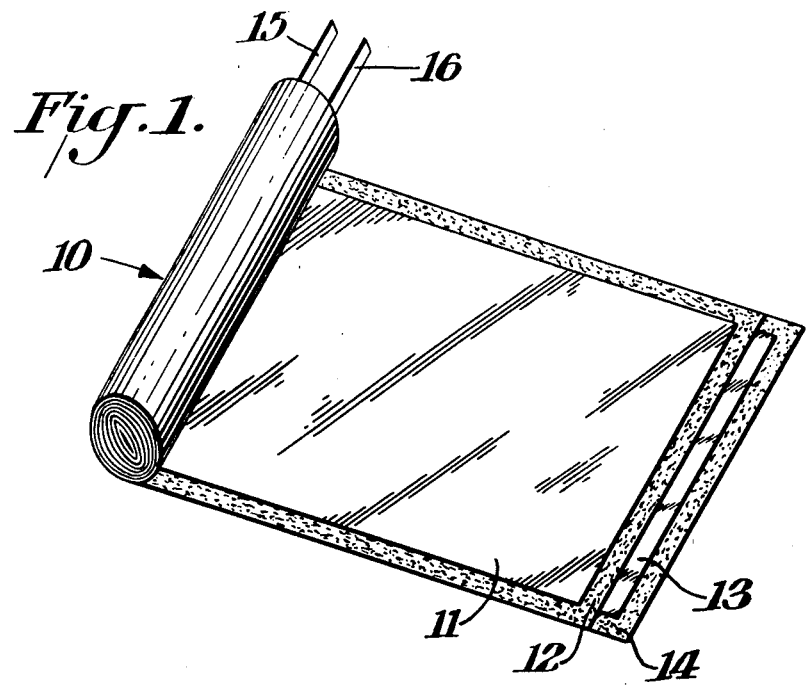
FIG. 1 shows a wound capacitor section partially unrolled.

Referring to FIG. 1, wound capacitor section 10 consists of anode foil 11 of aluminum having on its surface an insulating oxide barrier layer. Cathode foil 13 is also aluminum. Electrolyte absorbent layers 12 and 14, preferably paper, are positioned between the anode foil 11 and cathode foil 13 and interwound therewith. Tabs 15 and 16 are connected to electrodes 11 and 13, respectively, to provide for connection of the electrodes to leads. When completely wound, section 10 is impregnated with electrolyte (not shown).

Figure 2:
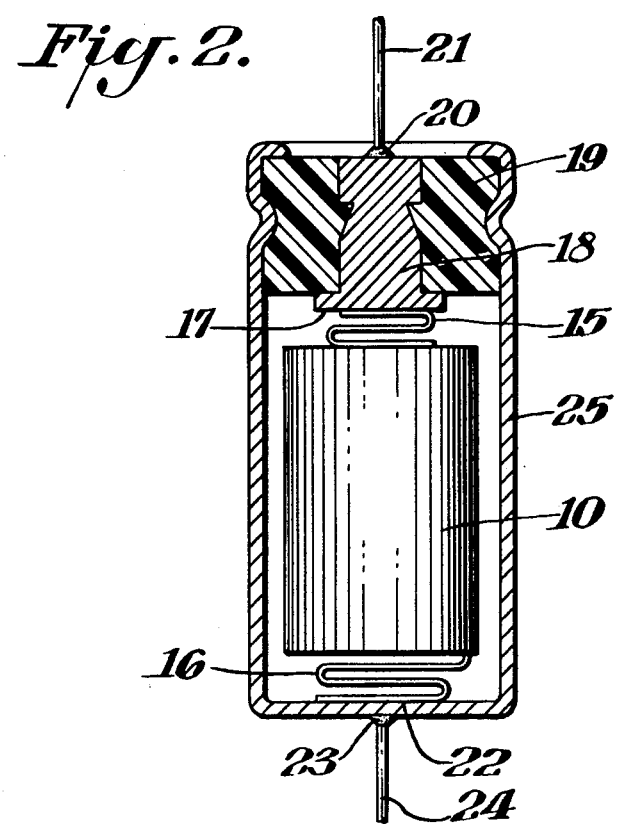
FIG. 2 is a cross-section of a capacitor containing a wound section.

FIG. 2 shows a cross-section of an axial capacitor in which the cathode tab 16 of capacitor section 10 is welded at 23 to cathode lead 24. Anode tab 15 is welded to portion 17 of insert 18 positioned in bushing 19 and welded at 20 to anode lead 21. Electrolyte (not shown) impregnates section 10.

The electrolyte is a solution of ethylene glycol, N-methyl-2-pyrrolidinone, water, and a mono salt of dodecanedioic acid with a dipropylamine or with a tertiary amine. The following examples show the utility of these electrolytes.

EXAMPLE 1

It was unexpected and unanticipated to find that, contrary to previous experience with other dicarboxylic acids, every tertiary amine that was tried with dodecanedioic acid gave results that met the objectives of this invention.

A typical formulation involving the tertiary amine salt, trimethylammonium hydrogen dodecanedioate, is that shown below.

TABLE 1a

| Formulation | wt % |
| --- | --- |
| Dodecanedioic Acid | 8.83 |
| Trimethylamine | 2.26 |
| Glycol | 42.52 |
| NMP | 39.60 |
| Water | 6.79 |
| Ohm-cm, 25° | 707 |
| $V_{MAX}$, 25° | 461 |

After 2063 hours at 125° the resistivity increased by 16% to 821 ohm-cm, and after 2063 hours at 150° the resistivity increased by 20.9% to 855 ohm-cm. At both temperatures all of the change occurred in the first 70 hours.

With triethylammonium hydrogen dodecanedioate, also prepared in situ, as were all of the other tertiary amine salts, the formulations shown in Table 1b were screened in the sealed tube test. After 1674 hours at 125° C. in a sealed tube, formulation A increased by 11% to 933 ohm-cm. After 1674 hours at 150° C., the increase in resistivity was essentially the same, 930 ohm-cm. After 2417 hours in a sealed tube, the resistivity for Formulation C increased by 16.9% to 1493 ohm-cm. After 2282 hours at 150° C., Formulation D increased by 9.2% to 1494 ohm-cm.

In addition, formulation E had a 105° C. resistivity of 112 ohm-cm, a 105° C. $V_{MAX}$ of 440–450 V, and a 125° C. $V_{MAX}$ of 435–445 V.

Electrolytes in which the solute is N-ethyl-piperidinium hydrogen dodecanedioate are amongst the preferred embodiments, and some of the many formulations that were explored are shown in Table 1c. Formulation A in this Table showed an increase in resistivity of 5.9% to 947 ohm-cm after 311 hrs at 150° C., and after 650 hours there was only a slight additional resistivity increase to 958 ohm-cm. Formulation I did not show any resistivity change after 2282 hours at 150° C., demonstrating the advantage of 24 hours refluxing as a pretreatment, but even without such pretreatment resistivity increases are less than 25% after 1000 hours at 150° C.

TABLE 1b

| Formulation (wt %) | A | B | C | D | E | F | G | H | I | J | K |
| --- | --- | --- | --- | --- | --- | --- | --- | --- | --- | --- | --- |
| Dodecanedioic acid | 15.79 | 18.22 | 26.19 | 24.85 | 18.29 | 4.87 | 2.58 | 11.02 | 6.11 | 2.55 | 3.58 |
| Triethylamine | 6.99 | 7.98 | 11.63 | 11.04 | 8.05 | 2.12 | 1.12 | 4.62 | 2.56 | 1.11 | 1.57 |
| Glycol | 37.81 | 39.91 | 10.07 | 16.22 | 35.16 | 23.24 | 24.62 | 41.64 | 46.13 | 37.19 | 47.92 |
| NMP | 35.31 | 33.07 | 47.63 | 44.91 | 32.66 | 65.55 | 69.44 | 38.92 | 43.10 | 56.93 | 44.76 |
| Water | 4.10 | 5.82 | 4.48 | 2.98 | 5.84 | 4.23 | 2.24 | 3.79 | 2.10 | 2.17 | 2.17 |
| Ohm-cm, 25° | 839 | 782 | 1277 | 1368* | 752 | 1448 | 2166 | 903 | 1254 | 1972 | 1607 |
| $V_{MAX}$, 25° | 472 | 460 | 470 | — | 440 | — | — | — | — | 555 | 515 |

*Stabilized in advance by refluxing for 24 hours.

TABLE 1c

| Formulation (wt %) | A | B | C | D | E | F | G | H | I | J |
|---|---|---|---|---|---|---|---|---|---|---|
| Dodecanedioic acid | 19.15 | 2.6 | 2.6 | 4.9 | 4.9 | 2.6 | 16.30 | 17.54 | 15.30 | 18.97 |
| N—ethyl-piperidine | 9.35 | 1.3 | 1.2 | 2.4 | 2.4 | 1.3 | 7.99 | 8.60 | 7.55 | 9.30 |
| NMP | 31.78 | 17.9 | 74.1 | 17.5 | 71.2 | 35.3 | 58.10 | 62.52 | 54.71 | 67.61 |
| Glycol | 34.69 | 73.8 | 17.6 | 70.4 | 16.6 | 53.3 | 14.07 | 7.53 | 18.57 | — |
| Water | 4.99 | 4.4 | 4.5 | 4.8 | 4.9 | 4.5 | 3.54 | 3.81 | 3.87 | 4.11 |
| Ohm-cm, 25° | 894* | 2584 | 2846 | 1562 | 1938 | 2166 | 1322 | 1676 | 1528* | 2679 |
| $V_{MAX}$, 25° | 460 | 560 | 580 | 515 | 540 | 538 | 488 | — | 510 | — |

*Prestabilized by refluxing for 24 hours.

Electrolytes having N-ethylpiperidinium hydrogen dodecanedioate as solute may be used to provide a systematic indication of the solvent effects due to variation of the ratio of NMP to glycol. These results are shown in Table 2a and FIG. 3. It should be noted that the enhanced conductivities for all solvent mixtures compared to either pure solvent obtain despite the fact that the two solvents have very similar properties, including even the dielectric constants (37 for glycol and 32 for NMP). It should be emphasized that such symbiotic interactions do not result from using two solvents of the same hydrogen bonding type, e.g. N-methyl-2-pyrrolidinone (NMP) and butyrolactone (BLO). The effects due to using mixtures of these two solvents are shown in Table 2b and FIG. 3.

Figure 3:
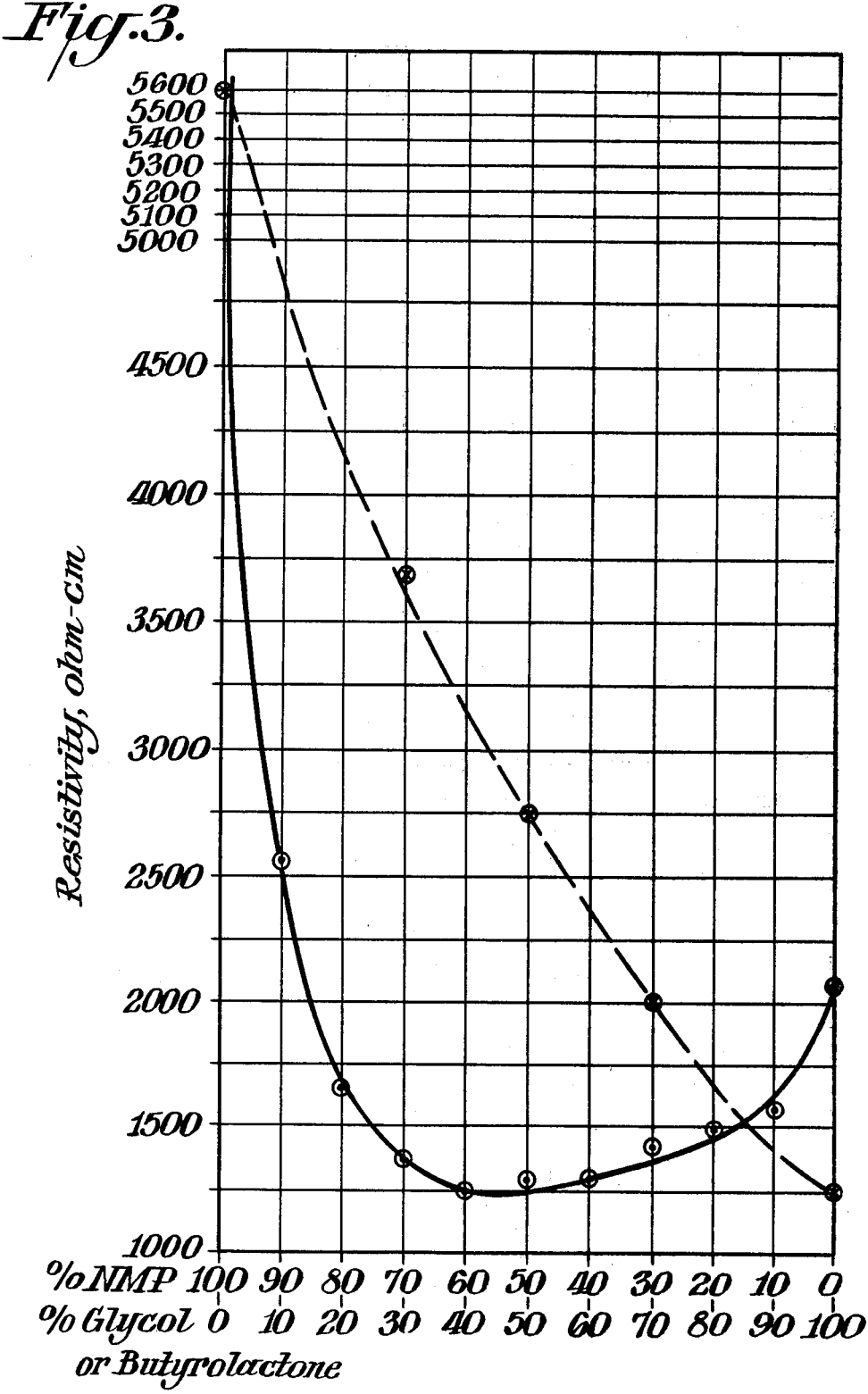
FIG. 3 compares resistivity graphs for mono(N-ethyl-piperidinium) dodecanedioate in two different solvent mixtures.

In FIG. 3, the solid line is a graph of the data presented in Table 2a and the dotted line is a graph of the data presented in Table 2b and show dramatically the difference between using solvents of different hydrogen bonding types (solid line) and of the same hydrogen bonding type (dotted line).

Each solution in Tables 2a and 2b contain as solute N-ethylpiperidinium hydrogen dodecanedioate formulated from 0.67 g (0.0029 mole) dodecanedioic acid, 0.33 g (0.0029 mole) N-ethylpiperidene, and 0.5 ml water.

TABLE 2a

| NMP (ml) | Glycol (ml) | Resistivity ohm-cm, 25° C. |
|---|---|---|
| 10 | 0 | 5586 |
| 9 | 1 | 2565 |
| 8 | 2 | 1653 |
| 7 | 3 | 1368 |
| 6 | 4 | 1254 |
| 5 | 5 | 1277 |
| 4 | 6 | 1277 |
| 3 | 7 | 1414 |
| 2 | 8 | 1482 |
| 1 | 9 | 1562 |
| 0 | 10 | 2085 |

TABLE 2b

| BLO (ml) | NMP (ml) | ohm-cm, 25° C. |
|---|---|---|
| 0 | 10 | 5586 |
| 3 | 7 | 3694 |
| 5 | 5 | 2736 |
| 7 | 3 | 2029 |
| 10 | 0 | 1265 |

EXAMPLE 3

The behavior of these electrolyte formulations in capacitors is illustrated using capacitors in which the electrolyte is Formulation E in Table 1b and in which the solute is triethylammonium hydrogen dodecanedioate. The capacitors used were a special design, 50 μF-200 V capacitors. They were built using 4-mil aluminum foil anode, aluminum foil cathode and 3-mil Manila spacers. The capacitors were aged for 2.5 hrs at 275 V and 105° C. on 50 KΩ boards. Twenty-five capacitors were life-tested at 130° C. and 200 VDC. The results are shown in Table 3, where every value indicated is the average of twenty-five capacitors.

Weight loss represents the weight of electrolyte lost and is a measure of capacitor life. When a capacitor has lost 40-50% of its electrolyte, it can be predicted to start deteriorating and going-off specification electrically. The capacitors below contained 2000 mg of electrolyte originally.

TABLE 3

| Hours | 120 Hz Cap. μF | 120 Hz ESR ohms | 2 min. DCL μA | 5 min. DCL μA | wt. loss, mg |
|---|---|---|---|---|---|
| 0 | 55.19 | 0.90 | 2.7 | 3.1 | — |
| 247 | 54.58 | 0.70 | 5.9 | 2.7 | 27.3 |
| 424 | 54.35 | 0.69 | 3.5 | 1.7 | 48.7 |
| 1000 | 54.28 | 0.75 | 2.5 | 1.2 | 120.2 |
| 1430 | 53.80 | 0.73 | 3.2 | 1.4 | 170.8 |
| 1572 | 54.12 | 0.76 | 2.3 | 1.1 | 190.2 |
| 2000 | 53.9 | 0.79 | 2.7 | 1.2 | 245.0 |
| 2500 | 53.7 | 0.85 | 2.6 | 1.2 | 308.4 |
| 3000 | 53.4 | 0.88 | 3.1 | 1.3 | 371.6 |

EXAMPLE 4

Two electrolytes were evaluated in 10 μF-450 V and 20 μF-450 V capacitors with and without a phosphate that had proved beneficial in other high voltage electrolyte formulations. The capacitors were aged at 400 V for 1 hr, 450 V for 1 hr, and 475 V for 2 hr, all at 85° C. on 50 KΩ boards. Shorts represent the ratio of the number of units shorting to the total number of units tested. Table 4a gives the electrolyte formulations, 25° C. resistivity in ohm-cm, and $V_{MAX}$ at 25° C. Table 4b presents capacitor test results.

TABLE 4a

| Formulation | A | B | C | D |
|---|---|---|---|---|
| Dodecanedioic acid | 57.5 g | 57.5 g | 40 g | 40 g |
| Diisopropylamine | 25.3 g | 25.3 g | — | — |
| Triethylamine | — | — | 17.5 g | 17.5 g |
| Water | 50 ml | 50 ml | 48 ml | 48 ml |
| Glycol | 500 ml | 500 ml | 420 ml | 420 ml |
| NMP | 500 ml | 500 ml | 700 ml | 700 ml |
| Phosphate | — | 2.4 g | — | 2.63 g |
| Ohm-cm | 1528 | 1425 | 1737 | 1630 |
| $V_{MAX}$ | 510 | 520 | 530 | 530 |

TABLE 4b

| | 10 μF - 450V | | 20 μF - 450V | |
|---|---|---|---|---|
| Formulation | Shorts | DCL(avg)μA | Shorts | DCL(avg)μA |
| A | 1/10 | 94.3 | 1/12 | 43.1 |

TABLE 4b-continued

| | 10 μF - 450V | | 20 μF - 450V | |
|---|---|---|---|---|
| Formulation | Shorts | DCL(avg)μA | Shorts | DCL(avg)μA |
| B | 1/10 | 28.1 | 0/14 | 37.6 |
| C | 0/10 | 113.6 | 3/15 | 64.8 |
| D | 0/10 | 23.9 | 0/13 | 51.2 |

The phosphate is beneficial as far as leakage current is concerned but is not necessary for operation at high voltages as it is in the adipate electrolyte of a copending application filed concurrently herewith by Finkelstein, Dunkl, and Ross.

EXAMPLE 5

This example shows electrolyte properties for the dipropylamine salts of the present invention. Three electrolyte formulations, shown below, in which the solute was di-n-propylammonium hydrogen dodecanedioate, prepared in situ, had good electrical properties and adequate stability.

TABLE 5a

| Formulation (wt %) | A | B | C |
|---|---|---|---|
| Dodecanedioic acid | 27.60 | 10.67 | 18.50 |
| Di-n-propylamine | 12.08 | 4.68 | 8.24 |
| NMP | 8.53 | 38.36 | 32.97 |
| Glycol | 49.54 | 41.19 | 35.42 |
| Water | 2.25 | 5.10 | 4.87 |
| Ohm-cm, 25° C. | 1053 | 953 | 866 |
| $V_{MAX}$, 25° C. | 468 | 485 | 463 |

It is to be noted that the concentrations of the individual components above can be varied widely while still permitting useful electrolyte properties. In electrolyte A, the water content can be doubled without changing $V_{MAX}$. The stability of these systems is suggested by the fact that 24 hours of reflux increases the resistivity of formulation C by less than 9%.

With diisopropylammonium hydrogen dodecanedioate, prepared in situ, as solute, good stability was observed. Some typical formulations are shown in Table 5b. After 24 hours of reflux, formulation A in Table 5b increased by less than 2% to 1022 ohm-cm and the resistivities of formulations D and E (Table 5b) were unchanged by 24 hours of reflux. After 2623 hours in a sealed tube at 150° C., the resistivity of formulation A increased to 1126 ohm-cm, an increase of less than 11%.

A batch quantity of formulation E was made with and without 0.2% ammonium dihydrogen phosphate and put on life test in 840 μF, 250 V capacitors. The electrolyte without phosphate had a room temperature resistivity of 1044 ohm-cm and a $V_{MAX}$ of 458 V at 25° C.; for the phosphate version, the resistivity was 1021 ohm-cm and $V_{MAX}$, 468 V. Preliminary capacitor data is given in Table 5c.

TABLE 5b

| Formulation (wt %) | A | B | C | D | E | F | G |
|---|---|---|---|---|---|---|---|
| Dodecanedioic Acid | 10.68 | 6.00 | 6.11 | 8.96 | 10.79 | 10.68 | 10.43 |
| Diisopropylamine | 4.69 | 2.62 | 2.69 | 3.94 | 4.69 | 4.69 | 4.58 |
| Glycol | 40.69 | 46.13 | 17.69 | 42.91 | 41.32 | 40.69 | 40.32 |
| NMP | 38.88 | 42.64 | 70.86 | 40.29 | 38.51 | 38.88 | 37.41 |
| Water | 5.06 | 2.61 | 2.66 | 3.90 | 4.69 | 5.06 | 7.26 |
| Ohm-cm, 25° C. | 1015 | 1322 | 1471 | 1090 | 1015 | 1015 | 969 |
| $V_{MAX}$, 25° C. | 488 | 500 | 520 | 493 | 480 | 488 | 488 |

TABLE 5c

| | | No Phosphate | Phosphate |
|---|---|---|---|
| 0 hrs | μF | 863.4 | 867.4 |
| | % DF | 7.08 | 7.17 |
| | μA | 89 | 120 |
| 250 hrs | μF | 856.4 | 853.5 |
| | % DF | 7.54 | 7.01 |
| | μA | 91 | 149 |
| | wt. loss, mg | 22 | 33 |
| | % Δ Cap | 0.8 | 1.6 |
| | Δ DF | +0.46 | −0.16 |

What is claimed is:

1. An aluminum electrolytic capacitor comprising two contiguously wound aluminum foil electrodes with interleaved spacers, one of said foils bearing a barrier layer dielectric oxide on its surface, and an electrolyte in contact therewith, said electrolyte comprising as solute a tertiary amine or dipropylamine mono salt of dodecanedioic acid dissolved in a solvent mixture consisting of ethylene glycol, N-methyl-2-pyrrolidinone, and water and exhibiting a resistivity at 25° C. lower than said electrolyte absent either ethylene glycol or N-methyl-2-pyrolidinone and providing a capacitor that operates at 130° C. and at least 200 V.

2. A capacitor according to claim 1 wherein said tertiary amine of said salt is chosen from the group consisting of trimethylamine, triethylamine, and ethylpiperidine.

3. A capacitor according to claim 2 wherein said salt is trimethylammonium hydrogen dodecanedioate.

4. A capacitor according to claim 2 wherein said salt is triethylammonium hydrogen dodecanedioate.

5. A capacitor according to claim 2 wherein said salt is N-ethylpiperidinium hydrogen dodecanedioate.

6. A capacitor according to claim 1 wherein said salt is di-n-propylammonium hydrogen dodecanedioate.

7. A capacitor according to claim 1 wherein said salt is diisopropylammonium hydrogen dodecanedioate.

8. A capacitor according to claim 1 wherein said electrolyte additionally contains a phosphate.

* * * * *